(12) United States Patent
Shuhua

(10) Patent No.: US 7,251,897 B2
(45) Date of Patent: Aug. 7, 2007

(54) BLADE CLAMPING DEVICE

(75) Inventor: Sang Shuhua, Suzhou (CN)

(73) Assignee: Positec Power Tools (Suzhou) Co., Ltd. (CN)

( * ) Notice: Subject to any disclaimer, the term of this patent is extended or adjusted under 35 U.S.C. 154(b) by 282 days.

(21) Appl. No.: 10/823,039

(22) Filed: Apr. 13, 2004

(65) Prior Publication Data

US 2004/0251642 A1   Dec. 16, 2004

(30) Foreign Application Priority Data

Apr. 14, 2003   (CN) .................. 2003 2 0021219

(51) Int. Cl.
  *B27B 3/30*     (2006.01)
  *B27B 19/09*    (2006.01)
(52) U.S. Cl. .................. 30/392; 30/393; 83/699.21; 279/71; 279/77
(58) Field of Classification Search ............... 30/392, 30/335, 393; 29/450; 279/23.1, 29, 35, 279/71, 72, 77, 81; 83/699.21
See application file for complete search history.

(56) References Cited

U.S. PATENT DOCUMENTS

| | | | | |
|---|---|---|---|---|
| 2,948,559 A | * | 8/1960 | Recker | 403/330 |
| 4,021,132 A | * | 5/1977 | Benjamin et al. | 408/127 |
| 5,340,129 A | * | 8/1994 | Wright | 30/392 |
| 5,573,255 A | * | 11/1996 | Salpaka | 279/75 |
| 5,575,071 A | * | 11/1996 | Phillips et al. | 30/392 |
| 5,722,309 A | * | 3/1998 | Seyerle | 83/699.21 |
| 5,987,758 A | * | 11/1999 | McCurry et al. | 30/392 |
| 6,053,675 A | * | 4/2000 | Holland et al. | 408/239 R |
| 6,112,420 A | | 9/2000 | Schickerling | |
| 6,209,208 B1 | * | 4/2001 | Marinkovich et al. | 30/392 |
| 6,533,291 B2 | * | 3/2003 | Huggins et al. | 279/29 |
| 6,638,290 B2 | * | 10/2003 | Pascaloff et al. | 606/177 |
| 6,725,548 B1 | * | 4/2004 | Kramer et al. | 30/392 |

FOREIGN PATENT DOCUMENTS

| | | |
|---|---|---|
| GB | 2 322 593 A | 9/1998 |
| JP | P 2000-84729 A | 3/2000 |
| WO | WO 03/099523 A2 | 12/2003 |

* cited by examiner

*Primary Examiner*—Boyer D. Ashley
*Assistant Examiner*—Edward Landrum
(74) *Attorney, Agent, or Firm*—Fulwider Patton LLP

(57) ABSTRACT

The present invention relates to a quick-change saw blade clamping device which includes an output shaft, a cylindrical rotatable sleeve and a torsion spring. The output shaft is coupled to a blade carrier which is disposed within the cylindrical rotatable sleeve. A rotatable member is disposed within the cylindrical rotatable sleeve. A locking member pivotally connected to the blade carrier lies in a guide groove which is formed on the blade carrier. A spiral surface is formed on the front end of the rotatable member. When the cylindrical rotatable sleeve is manually rotated, the spiral surface urges the locking member to press the blade into a locking position. The present invention provides an easily-operated clamping device of simple structure and small size.

21 Claims, 5 Drawing Sheets

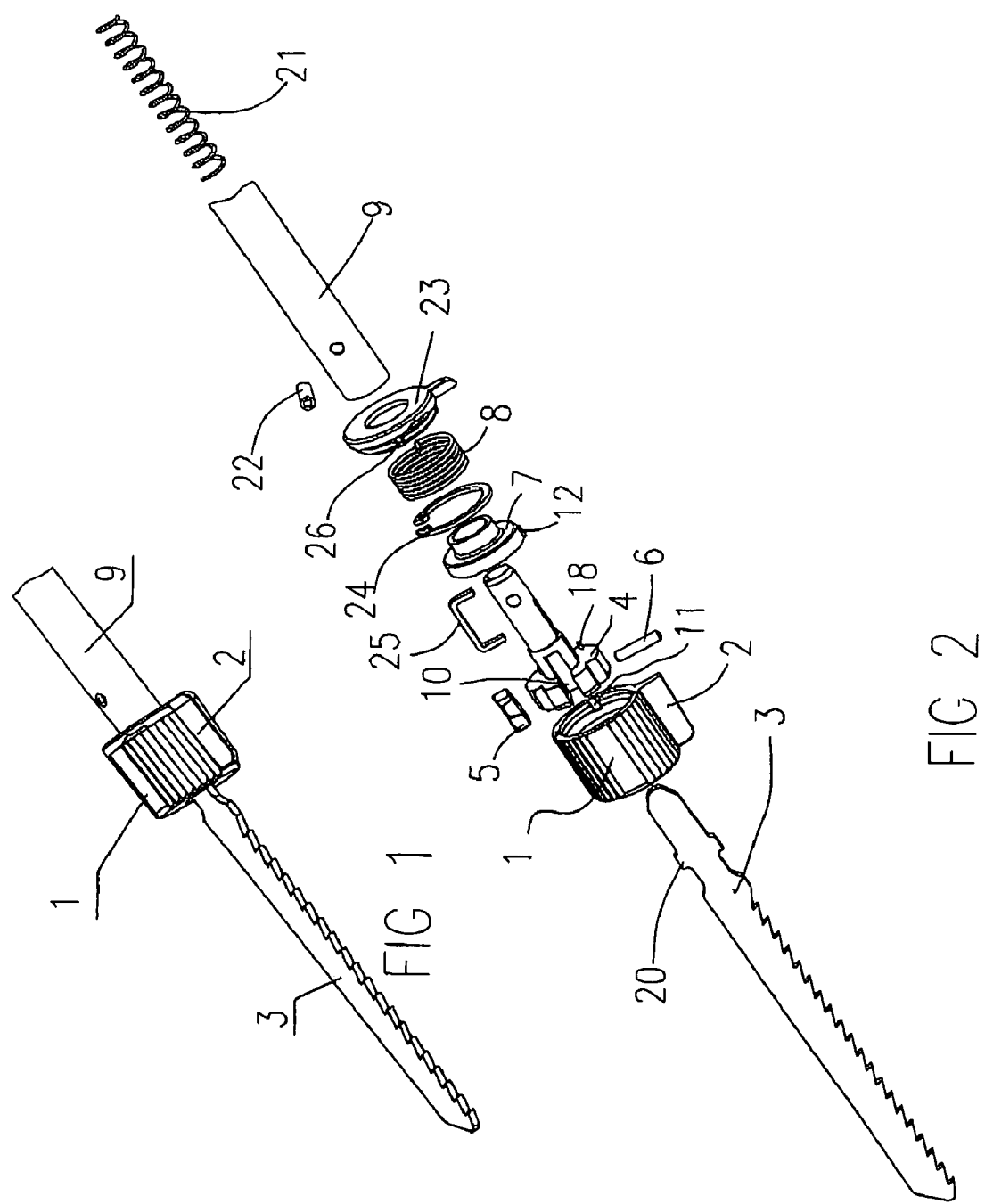

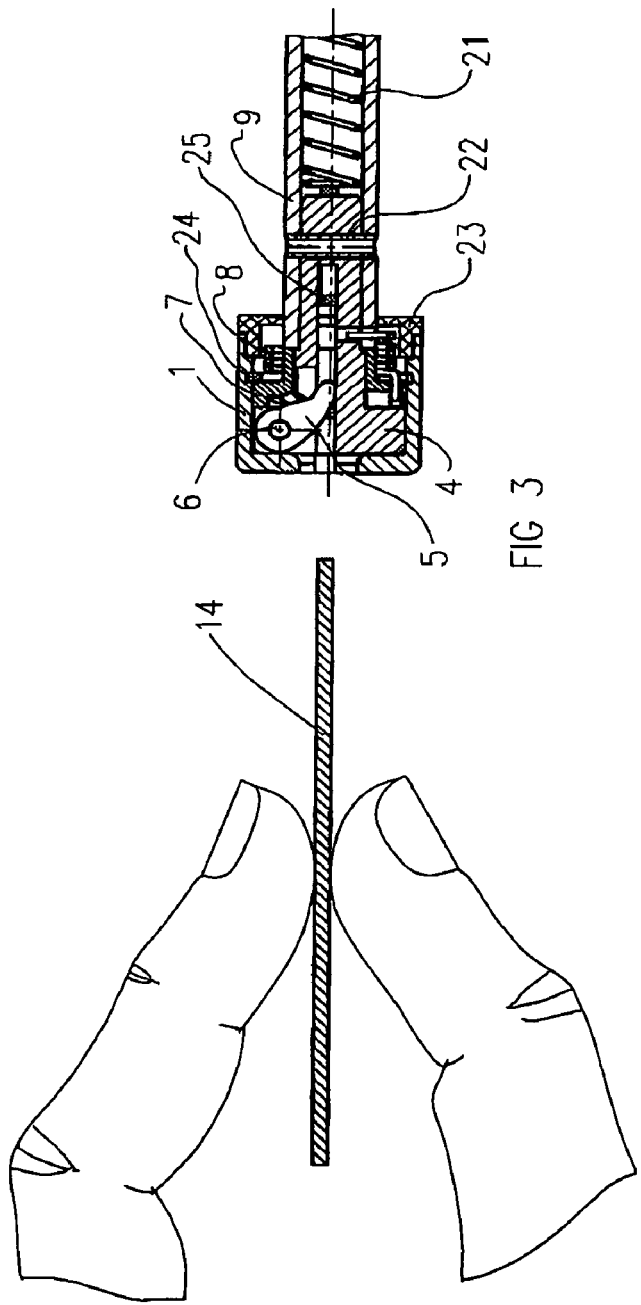
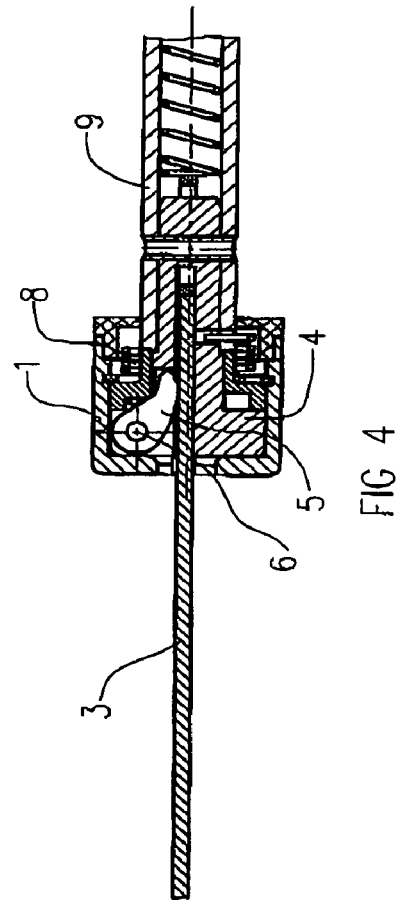
FIG 3
FIG 4

BLADE CLAMPING DEVICE

FIELD OF THE INVENTION

The present invention relates to a blade clamping device for clamping the blade of (for example) a power saw such as a jigsaw or reciprocating saw.

BACKGROUND

CN-A-1217675 discloses a blade clamping device which disadvantageously needs to be riveted together. U.S. Pat. No. 5,165,173 discloses a saw in which the blade is fixed to the drive shaft by means of fixing screws so that it is very inconvenient to remove the saw blade. In the blade clamping device of U.S. Pat. No. 5,324,052, the blade is pressed by a spring-loaded clamping piece against a slot wall but the clamping device is very big and its operation is inconvenient.

SUMMARY OF THE INVENTION

The object of the present invention is to provide a blade (e.g. saw blade) clamping device which allows a blade to be replaced quickly.

Thus viewed from one aspect the present invention provides a blade clamping device for clamping a blade comprising a cylindrical rotatable sleeve having a proximal end in which is formed an aperture for a blade; a rotatable member mounted substantially coaxially within the cylindrical rotatable sleeve and having a proximal end; a blade carrier disposed within the cylindrical rotatable sleeve and having a proximal end in which is formed a blade receiving slot for the blade and a distal end; an output shaft coupled to the distal end of the blade carrier; a torsion spring for biasing the clamping device from a non-clamping configuration in which the blade is insertable into the blade carrier to a clamping configuration in which the blade is able to be clamped in the blade carrier; a guide groove radially and axially extending from an exterior surface of the blade carrier and communicating with the blade receiving slot; a locking member pivotally mounted in the guide groove on a pin; and a spiral surface disposed at the proximal end of the rotatable member, wherein the cylindrical rotatable sleeve is manipulable rotationally from the clamping configuration to the non-clamping configuration whereat the aperture is aligned with the blade receiving slot for inserting in the blade in the blade carrier and wherefrom the cylindrical rotatable sleeve is automatically biased back to the clamping configuration by the torsion spring whereat the aperture is non-aligned with the blade receiving slot and the spiral surface positively engages a curved surface of the locking member giving the locking member a tendency to rotate about the pin thereby causing the locking member to positively engage the blade in the blade carrier.

The present invention is a quick-change saw blade clamping device comprising an output shaft, a cylindrical rotatable sleeve and a torsion spring. The output shaft is coupled to a blade carrier which is disposed within the cylindrical rotatable sleeve. A blade receiving slot is formed on a front end of the blade carrier. An aperture is formed on a front end portion of the cylindrical rotatable sleeve. The cylindrical rotatable sleeve is integrally mounted to and disposed within the cylindrical rotatable sleeve. A guide groove radially and axially extends from an outer surface of the blade carrier and communicates with the blade receiving slot. A locking member is pivotally connecting to the blade carrier and disposed in the guide groove. A spiral surface is disposed at a front head end of the rotatable member and under a state in which a blade is clamped in a locking position, the spiral surface presses against the rear side surface of the locking member.

The present invention provides an easily-operated blade clamping device with a simple structure and small size which permits a blade to be quickly released and replaced.

The cylindrical rotatable sleeve may be manipulable rotationally by manual actuation of its exterior surface for which purpose the exterior surface may be provided with knurlings, a projection or a handle.

Preferably the cylindrical rotatable sleeve automatically rotates back from the non-clamping configuration to the clamping configuration by releasing the cylindrical rotatable sleeve.

Preferably when the locking member positively engages the blade in the blade carrier, the cylindrical rotatable sleeve is manipulable rotationally from the clamping configuration to the non-clamping configuration whereat the aperture is aligned with the blade receiving slot for releasing the blade (e.g. mechanically releasing the blade). Particularly preferably the blade is mechanically ejected.

Preferably the blade carrier rotatably contacts a front end surface of the rotatable member and a rear rod of the blade carrier passes through a central aperture of the rotatable member.

Preferably the torsion spring has a first end to which is connected the rotatable member and a second end to which is connected the output shaft.

Preferably a protrusive rib extends axially along the exterior surface of the rotatable member and a second retaining groove extends axially along the interior surface of the cylindrical rotatable sleeve, wherein the protrusive rib fits into the groove to securely retain the rotatable member and the cylindrical rotatable sleeve together.

Preferably two protrusive stoppers are provided on the ends of the spiral surface and an end portion of the blade carrier facing the spiral surface is provided with a limiting pin which is able to move between the protrusive stoppers.

Preferably the blade carrier has a proximal head on a distally extending rod and is disposed partly within the cylindrical rotatable sleeve such that the distally extending rod passes through and out of the distal end of the rotatable member and the proximal head is slidably seated on the proximal end of the cylindrical sleeve. The guide groove extends substantially radially from the circumference of the proximal head and communicates with the blade receiving slot. The guide groove may be substantially rectangular. The proximal head may be essentially circular and the pin may be mounted along a chord of the proximal head.

Preferably the cylindrical rotatable sleeve and rotatable member are mounted substantially coaxially in a manner so as to prevent relative rotation. For this purpose, opposing faces of the cylindrical rotatable sleeve and rotatable member may be provided with engageable male and female portions. For example, an axial retaining rib in the exterior surface of the rotatable member may engage an axial retaining groove on the interior surface of the cylindrical rotatable sleeve.

To prevent relative axial movement of the cylindrical rotatable sleeve and rotatable member, a retaining element (e.g. a circlip) may be mounted circumferentially on the interior surface at or near to the distal end of the cylindrical rotatable sleeve.

Preferably the rotatable member has a cylindrical main body integrally formed at a proximal end with a cylindrical sleeve.

Preferably the surface of the proximal end of the cylindrical main body spirals axially along the interior of the cylindrical sleeve to define the spiral surface terminating at the proximal end of the cylindrical sleeve.

Preferably a first and a second protrusive stopper project radially inwardly from the proximal end of the cylindrical sleeve. In a particularly preferred embodiment, the device further comprises a limiting pin on the proximal head of the blade carrier, wherein said limiting pin engages the spiral surface along a path between the first protrusive stopper and the second protrusive stopper so as to limit the rotational range of the rotatable member in the clockwise and counter-clockwise direction.

In a preferred embodiment, the device further comprises a restoring member (e.g. spring) accommodated within the output shaft and capable of cooperating with the distal end of the blade, wherein when the blade is inserted in the blade carrier, the restoring member is biased with a tendency to eject the blade and when the blade is not inserted in the blade carrier, the restoring member is at rest. Preferably the restoring member cooperates with a force transmitting element (e.g. a U-shaped member) for ejecting the blade when the cylindrical rotatable sleeve is manually rotated from the clamping configuration to the non-clamping configuration.

Preferably the locking member is pivotal between a first position in the non-clamping configuration in which it is remote from the spiral surface and a second position in the clamping configuration in which it positively engages the spiral surface. Particularly preferably the locking member is capable of being pivoted between the first position and the second position by the insertion of the blade. Typically the blade is inserted manually in the non-clamping configuration.

In a preferred embodiment, the locking member is an irregular shape e.g. a substantially teardrop-shaped.

Viewed from a further aspect the present invention provides a saw comprising a blade clamping device as hereinbefore defined and a blade.

BRIEF DESCRIPTION OF THE DRAWINGS

FIG. 1 is a perspective view of an embodiment of the present invention assembled with a blade;

FIG. 2 is an exploded view of the essential parts of the embodiment of FIG. 1;

FIG. 3 is a partial cross-sectional view of the embodiment of FIG. 1 in the clamping configuration (blade not inserted);

FIG. 4 is a partial cross-sectional view of the embodiment of FIG. 1 in the clamping position (blade inserted);

DESCRIPTION OF PREFERRED EMBODIMENTS

Figure 5:
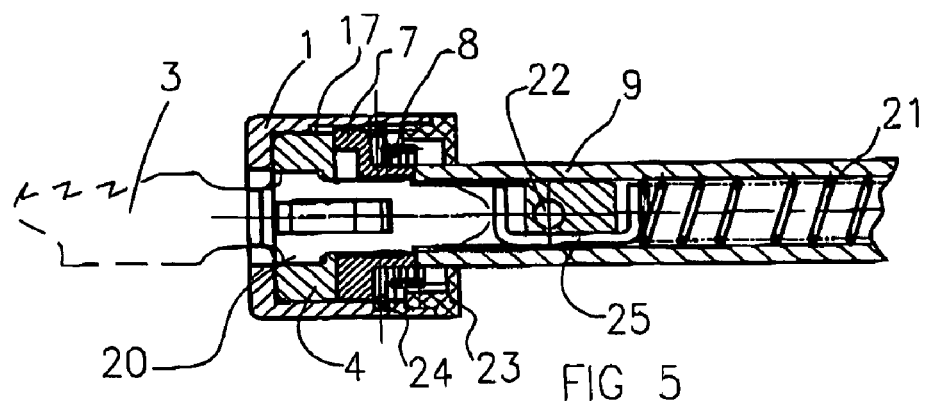
FIG. 5 is a top cross-sectional view of FIG. 4.

Referring to FIGS. 1 and 2, an embodiment of the blade clamping device of the invention is illustrated comprising a rotatable member 7 mounted coaxially within a cylindrical rotatable sleeve 1. The rotatable member 7 has a cylindrical main body 7a integrally formed at a proximal end with a cylindrical sleeve 7b. A protrusive rib 12 extends axially along the exterior surface of the cylindrical sleeve 7b (see FIG. 9) and a second retaining groove 17 extends axially along the interior surface of the cylindrical rotatable sleeve 1 (see FIG. 5). The protrusive rib 12 fits into the second retaining groove 17 to securely retain the rotatable member 7 and the cylindrical rotatable sleeve 1 together. Additionally a circlip 24 is mounted in a groove formed on the interior surface of the cylindrical rotatable sleeve 1 and engages the cylindrical sleeve 7b so as to retain the rotatable member 7 axially within the cylindrical rotatable sleeve 1 (i.e. the circlip 24 prevents axial movement).

Figure 6:
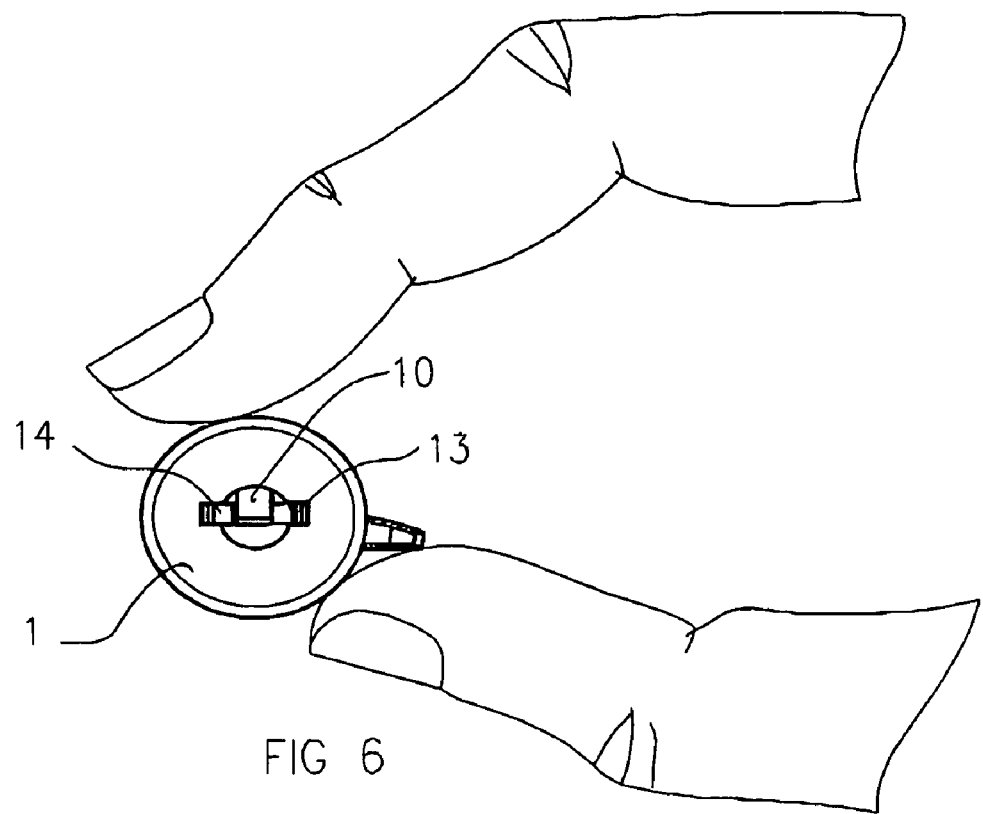
FIG. 6 is a left view of FIG. 3.
Figure 7:
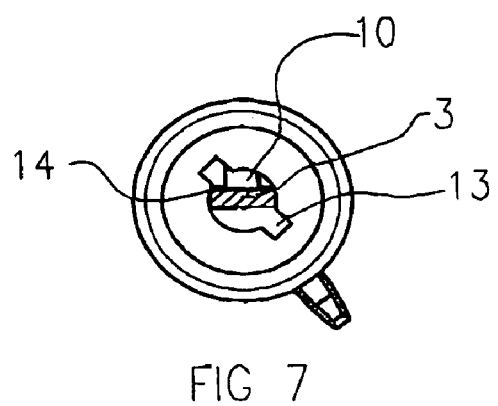
FIG. 7 is a left view of FIG. 4.
Figure 12:
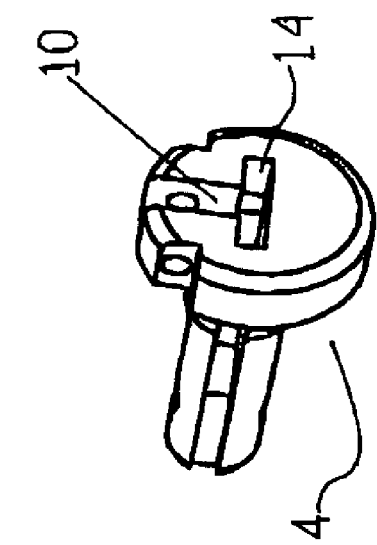
FIG. 12 is a further perspective view detailing a blade carrier of an embodiment of the present invention.
Figure 11:
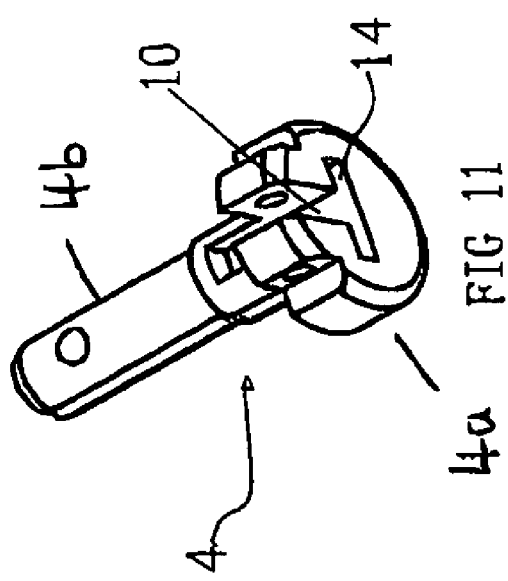
FIG. 11 is a perspective view detailing a blade carrier of an embodiment of the present invention.
Figure 13:
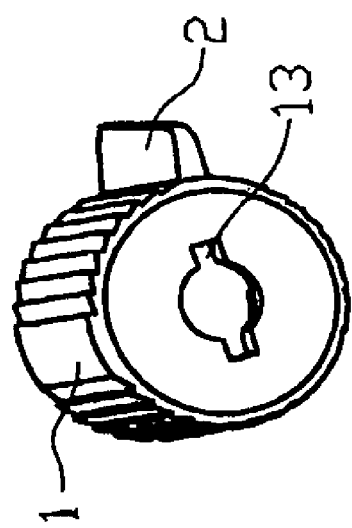
FIG. 13 is a perspective view detailing a cylindrical rotatable sleeve of an embodiment of the present invention.

A blade carrier 4 having a proximal head 4a on a distally extending rod 4b is disposed partly within the cylindrical rotatable sleeve 1 such that the distally extending rod 4b passes through and out of the distal end of the rotatable member 7 and the proximal head 4a is slidably seated on the proximal end of the cylindrical sleeve 7b. A blade receiving slot 14 for receiving a blade 3 is defined in the proximal head 4a (see FIGS. 6, 11 and 12) and an aperture 13 in the proximal end of the cylindrical rotatable sleeve 1 extends across the blade receiving slot 14 (see FIGS. 6, 7 and 13). An output shaft 9 is coupled by a pin 22 to the distally extending rod 4b. A first end of a torsion spring 8 is connected to the rotatable member 7 and a second end of the torsion spring 8 is connected to the output shaft 9.

Figure 9:
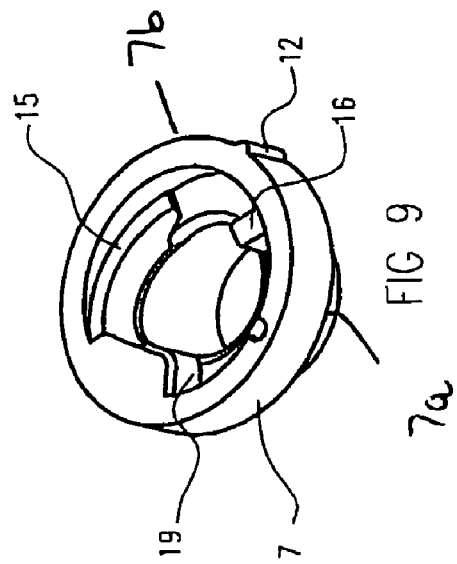
FIG. 9 is a perspective view detailing a rotatable member of an embodiment of the present invention.
Figure 10:
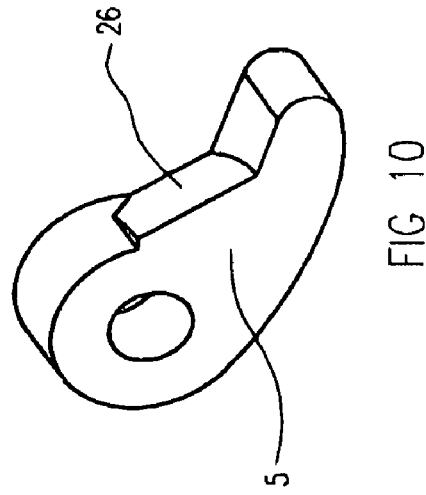
FIG. 10 is a further perspective view detailing a locking member of an embodiment of the present invention.

Referring to FIGS. 4 and 9, the surface of the proximal end of the cylindrical main body 7a spirals axially along the interior of the cylindrical sleeve 7b to define a spiral surface 15 terminating at the proximal end of the cylindrical sleeve 7b. Two protrusive stoppers 16, 19 project radially inwardly from the proximal end of the cylindrical sleeve 7b. A limiting pin 18 on the proximal head 4a of the blade carrier 4 engages the spiral surface 15 along a path between the protrusive stopper 16 and the protrusive stopper 19 so as to limit the rotational range of the rotatable member 7 in the clockwise and counter-clockwise direction relative to the blade carrier 4.

Figure 8:
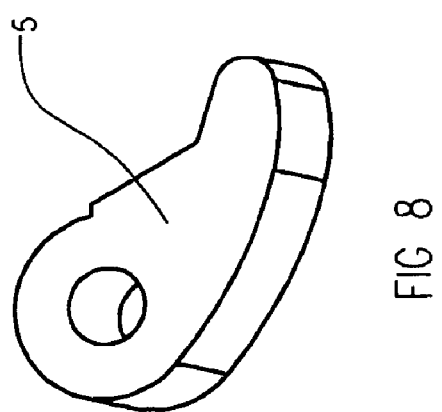
FIG. 8 is a perspective view detailing a locking member of an embodiment of the present invention.

A guide groove 10 extends radially from the exterior surface of the proximal head 4a of the blade carrier 4 into the blade receiving slot 14. An irregular-shaped locking member 5 capable of engaging the spiral surface 15 is pivotally mounted in the guide groove 10 by means of a pin 6 (see FIG. 8). An end cap 23 for the cylindrical rotatable sleeve 1 has a rib 26 which cooperates with a first retaining groove 11 formed on the cylindrical rotatable sleeve 1. A spring 21 accommodated within the output shaft 9 cooperates with a force transmitting element 25 for elastically ejecting the saw blade 3 on release.

Referring to FIGS. 3 to 7, a projection 2 which extends radially from the exterior surface of the cylindrical rotatable sleeve 1 is manipulated rotationally to a position in which the aperture 13 of the cylindrical rotatable sleeve 1 is aligned with the a blade receiving slot 14 of the blade carrier 4 (see FIG. 6) and in which the torsion spring 8 is then under tension. A saw blade 3 is inserted into the blade receiving slot 14 and pressed against the force transmitting element 25 so as to compress the spring 21. When the projection 2 is released and the cylindrical rotatable sleeve 1 seeks to return to its initial position under the force of the torsion spring 8, the spiral surface 15 of the rotatable member 7 engages the edge of the locking member 5 causing the locking member 5 to rotate about the pin 6 and impinge on the saw blade 3. At the same time, the aperture 13 of the cylindrical rotatable sleeve 1 is disaligned with the a blade receiving slot 14 i.e. the aperture 13 of the cylindrical rotatable sleeve 1 is disaligned with the saw blade 3 (see FIG. 7) so that the blade projections 20 are tightly clamped against the interior face of the proximal end of the cylindrical rotatable sleeve 1. As such, the saw blade 3 will be securely locked within the clamping device.

Referring to FIGS. 3-7, the projection 2 is manually rotated to a position in which the aperture 13 is again aligned with the blade receiving slot 14 (see FIG. 6) and the saw blade 3 will be ejected from the clamping device under the elastic restoring force of the spring 21 without injuring the operator with a hot saw blade just after working.

I claim:

1. A blade clamping device for clamping a blade comprising:
   a cylindrical rotatable sleeve having a proximal end in which is formed an aperture for a blade;
   a rotatable member mounted substantially coaxially within the cylindrical rotatable sleeve and having a proximal end;
   a blade carrier disposed within the cylindrical rotatable sleeve and having a proximal end in which is formed a blade receiving slot for the blade and a distal end;
   an output shaft coupled to the distal end of the blade carrier;
   a torsion spring for biasing the clamping device from a non-clamping configuration in which the blade is insertable into the blade carrier to a clamping configuration in which the blade is able to be clamped in the blade carrier;
   a guide groove radially and axially extending from an exterior surface of the blade carrier (4) and communicating with the blade receiving slot;
   a locking member pivotally mounted in the guide groove on a pin; and
   a spiral surface disposed at the proximal end of the rotatable member,
   wherein the cylindrical rotatable sleeve is manipulable rotationally to the non-clamping configuration whereat the aperture is aligned with the blade receiving slot for inserting the blade into the blade carrier and wherefrom the cylindrical rotatable sleeve is biased back to the clamping configuration by the torsion spring whereat the aperture is non-aligned with the blade receiving slot so as to cause said proximal end of said rotatable sleeve to engage the blade and the spiral surface positively engages a curved surface of the locking member giving the locking member a tendency to rotate about the pin thereby causing the locking member to positively engage the blade in the blade carrier.

2. The device according to claim 1 wherein when the locking member positively engages the blade, the cylindrical rotatable sleeve is biased back from the non-clamping configuration to the clamping configuration by releasing the cylindrical rotatable sleeve.

3. The device according to claim 1 wherein the cylindrical rotatable sleeve is manipulable rotationally from the clamping configuration to the non-clamping configuration whereat the aperture is aligned with the blade receiving slot for releasing the blade.

4. The device according to claim 1, wherein the blade carrier rotatably contacts a front end surface of the rotatable member and a rear rod of the blade carrier passes through a central aperture of the rotatable member.

5. The device according to claim 1, wherein the torsion spring has a first end to which is connected the rotatable member and a second end to which is connected the output shaft.

6. The device according to claim 1, wherein a protrusive rib extends axially along the exterior surface of the rotatable member and a second retaining groove extends axially along the interior surface of the cylindrical rotatable sleeve, wherein the protrusive rib fits into the groove to securely retain the rotatable member and the cylindrical rotatable sleeve together.

7. The device according to claim 1, wherein two protrusive stoppers are provided on the ends of the spiral surface and an end portion of the blade carrier facing the spiral surface is provided with a limiting pin which is able to move between the protrusive stoppers.

8. The device according to claim 1 wherein the cylindrical rotatable sleeve and rotatable member are mounted substantially coaxially in a manner so as to prevent relative rotation.

9. The device according to claim 1, wherein the rotatable member has a cylindrical main body integrally formed at a proximal end with a cylindrical sleeve.

10. The device according to claim 9, wherein the blade carrier has a proximal head on a distally extending rod and is disposed partly within the cylindrical rotatable sleeve such that the distally extending rod passes through and out of the distal end of the rotatable member and the proximal head is slidably seated on the proximal end of the cylindrical sleeve.

11. The device according to claim 9, wherein the surface of the proximal end of the cylindrical main body spirals axially along the interior of the cylindrical sleeve to define the spiral surface terminating at the proximal end of the cylindrical sleeve.

12. The device according to claim 9, wherein a first and a second protrusive stopper project radially inwardly from the proximal end of the cylindrical sleeve.

13. The device according to claim 12 further comprising a limiting pin on the proximal head of the blade carrier, wherein said limiting pin is movable between the first protrusive stopper and the second protrusive stopper so as to limit the rotational range of the rotatable member.

14. The device according to claim 1 further comprising a restoring member accommodated within the output shaft and capable of cooperating with the distal end of the blade, wherein the restoring member in the clamping configuration is biased towards ejecting the blade and in the non-clamping configuration is at rest.

15. The device of claim 14 wherein the restoring member cooperates with a force transmitting element for ejecting the blade on manipulation rotationally from the clamping configuration to the non-clamping configuration.

16. The device according to claim 1 wherein the locking member is pivotal between a first position in the non-clamping configuration in which it is remote from the spiral surface and a second position in the clamping configuration in which it positively engages the spiral surface.

17. The device according to claim 16 wherein the locking member is capable of being pivoted between the first position and the second position by the insertion of the blade.

18. The device according to claim 1 wherein the locking member is an irregular shape.

19. The device according to claim 18 wherein the locking member is substantially teardrop-shaped.

20. The device according to claim 1, further comprising a blade.

21. A quick-change saw blade clamping device comprising an output shaft, a rotatable sleeve, a rotatable member and a torsion spring, said output shaft is coupled to a blade carrier which is disposed within said rotatable sleeve, a blade receiving slot is formed on a front end of said blade carrier, an aperture is formed on a front end portion of said rotatable sleeve, wherein said rotatable sleeve is rotatable between a position in which said aperture and said blade receiving slot are aligned to allow a blade to be extended therethrough and a position in which said aperture and said blade receiving slot are non-aligned to cause a blade extending therethrough to engage said front end portion of said rotatable sleeve, characterized in that said rotatable member is integrally mounted to and disposed within said rotatable sleeve, a guide groove radially and axially extending from an outer surface of said blade carrier and communicating with said blade receiving slot, a locking member is pivotally connected to said blade carrier and disposed in said guide groove, a spiral surface is disposed at a front head end of said rotatable member, under a state in which a blade clamped in a locking position, said spiral surface presses against the rear side surface of said locking member.

* * * * *